(12) United States Patent
Mayer et al.

(10) Patent No.: US 12,341,564 B2
(45) Date of Patent: Jun. 24, 2025

(54) SYSTEM AND A METHOD FOR TESTING A JOINT COMMUNICATION AND SENSING, SIGNAL

(71) Applicant: Rohde & Schwarz GmbH & Co. KG, Munich (DE)

(72) Inventors: Timo Mayer, Munich (DE); Mikhail Volianskii, Mering (DE); Meik Kottkamp, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 384 days.

(21) Appl. No.: 17/838,975

(22) Filed: Jun. 13, 2022

(65) Prior Publication Data

US 2023/0403085 A1    Dec. 14, 2023

(51) Int. Cl.
| | |
|---|---|
| *H04B 17/00* | (2015.01) |
| *G01S 7/00* | (2006.01) |
| *G01S 7/40* | (2006.01) |

(52) U.S. Cl.
CPC .......... *H04B 17/0085* (2013.01); *G01S 7/006* (2013.01); *G01S 7/40* (2013.01)

(58) Field of Classification Search
CPC ..... H04B 17/0085; H04B 17/29; G01S 7/006; G01S 7/40; G01S 7/4082; G01S 7/4095
See application file for complete search history.

(56) References Cited

U.S. PATENT DOCUMENTS

| | | | | |
|---|---|---|---|---|
| 11,178,691 B2 * | 11/2021 | Bayesteh | ............ | H04W 52/243 |
| 11,595,993 B2 * | 2/2023 | Yerramalli | ............ | H04W 72/21 |
| 11,638,258 B2 * | 4/2023 | Bayesteh | ............ | G01S 7/0234 |
| | | | | 370/336 |
| 2016/0266245 A1 * | 9/2016 | Bharadia | ................ | G01S 7/038 |
| 2018/0042066 A1 * | 2/2018 | Kremo | .................... | G01S 13/86 |
| 2018/0259635 A1 * | 9/2018 | Bianchi | ............ | G01S 15/8977 |
| 2021/0076367 A1 * | 3/2021 | Bayesteh | ............ | G01S 7/0232 |
| 2021/0076417 A1 * | 3/2021 | Bayesteh | ............ | H04W 72/54 |
| 2021/0266961 A1 * | 8/2021 | Yerramalli | ............ | H04W 72/21 |
| 2021/0360696 A1 * | 11/2021 | Chendamarai Kannan | ................. | |
| | | | | H04W 24/08 |
| 2021/0406722 A1 * | 12/2021 | Armstrong-Crews | ....................... | |
| | | | | G06N 20/00 |
| 2022/0225121 A1 * | 7/2022 | Wanuga | ................ | H04L 5/0048 |
| 2023/0086144 A1 * | 3/2023 | Roy | ........................ | H04L 5/005 |

(Continued)

FOREIGN PATENT DOCUMENTS

| | | |
|---|---|---|
| CN | 114079598 A | 2/2022 |
| EP | 3 183 917 B1 | 7/2018 |

*Primary Examiner* — Stephen M D Agosta
(74) *Attorney, Agent, or Firm* — DITTHAVONG, STEINER & MLOTKOWSKI

(57) ABSTRACT

This disclosure relates to signal testing, and is concerned with testing a joint communication and sensing (JCAS) signal. A system for testing a JCAS signal received from a device under test (DUT) and a corresponding method are provided.

The JCAS signal comprises a communication signal and a sensing signal. The system is configured to perform a signaling test on the communication signal, the signaling test producing a communication response signal, and to perform a sensing test on the sensing signal, the sensing test producing a sensing response signal. Further, the system is configured to send a feedback signal to the DUT, the feedback signal including the communication response signal and the sensing response signal.

14 Claims, 8 Drawing Sheets

(56) References Cited

U.S. PATENT DOCUMENTS

| | | | | |
|---|---|---|---|---|
| 2023/0224696 A1* | 7/2023 | Li | ............... | H04L 5/0053 |
| | | | | 370/252 |
| 2023/0231637 A1* | 7/2023 | Li | ............... | H04B 17/345 |
| | | | | 370/252 |
| 2023/0300805 A1* | 9/2023 | Li | ............... | H04W 72/51 |
| | | | | 370/329 |
| 2023/0393254 A1* | 12/2023 | Goyal | ............... | G01S 7/003 |
| 2024/0036166 A1* | 2/2024 | Geng | ............... | G01S 7/412 |
| 2024/0049161 A1* | 2/2024 | Katla | ............... | H04B 17/15 |

* cited by examiner

SYSTEM AND A METHOD FOR TESTING A JOINT COMMUNICATION AND SENSING, SIGNAL

TECHNICAL FIELD

The present disclosure relates to signal testing. The disclosure is concerned with testing a joint communication and sensing (JCAS) signal. To this end, the disclosure provides a system for testing a JCAS signal received from a device under test (DUT), and provides a corresponding testing method.

BACKGROUND

A conventional communication system typically does not employ sensing, wherein sensing may mean that the surroundings of the communication system are scanned with the help of radio signals. Some exemplary communication systems employ sensing, for instance, to improve their communication interfaces. To this end a sensing signal is provided in parallel to a communication signal, as shown in FIG. 1(A). For example, different parts of the spectrum can be used for the communication signal and the sensing signal, respectively.

Another example of a system that employs sensing is a passive radar system, wherein a passive sensor uses radio emission of a primary transmitter for radar emission. In both examples, however, the interaction between the two parts of the system is one-sided, and there is no cooperation or joint optimization between sensing and communication.

In future communications systems, for instance, in mobile communications systems of the sixth generation (6G), the core functionalities may be expanded to include sensing. In particular, JCAS may be used in these communication systems to sense the environment with the aid of mobile radio signals.

For JCAS, the sensing signal will be integrated with the communication signal, as it is shown in FIG. 1(B). For instance, the communication signal and the sensing signal may be superposed and optionally interleaved in time. That is, some time slots of the joint signal may be allocated to the sensing signal, and some other time slots may be allocated to the communication signal.

In this way, the sensing functionality itself may become part of the communication system. In other words, the aim is to deeply integrate sensing into future communications systems, in contrast to other approaches, where the sensing functionality is realized by a separate system (such as automotive radar), if at all.

SUMMARY

To achieve the integration of sensing and communication, there is a need to measure and test such communication systems or communication devices that employ JCAS. For instance, there is a need to provide a system and method suitable for testing a device under test (DUT) that employs or contributes to JCAS.

This can be achieved by the subject matter described in the independent claims. Advantageous implementations are described in the dependent claims.

A first aspect of this disclosure provides a system for testing a JCAS signal received from a DUT, the JCAS signal comprising a communication signal and a sensing signal, and the system being configured to perform a signaling test on the communication signal, the signaling test producing a communication response signal, perform a sensing test on the sensing signal, the sensing test producing a sensing response signal, and send a feedback signal to the DUT, the feedback signal including the communication response signal and the sensing response signal.

As an example, the system may comprise processing circuitry, which is adapted to perform the signaling test, perform the sensing test, and generate the feedback signal. For instance, the processing circuitry comprises one or more processors and a memory connected to the one or more processors. The memory may be a non-transitory memory and may carry executable program code, which, when executed by the one or more processors, causes the system to perform the signaling test, the sensing test, and generate the feedback signal. The memory may be in the form of random access memory, RAM, or flash memory, or read only memory (ROM), or magnetic or ferroelectric memory.

For example, the signaling test may include decoding the communication signal, wherein successful decoding may be verified. Generating the communication response signal may include encoding the previously decoded, and optionally verified, communication signal, in the same way as the communication signal in the JCAS was encoded. This may be done, respectively, by at least one decoder and encoder of the processing circuitry.

For example, the signaling test may include analyzing the sensing signal. Further, for example, the signaling test and generating of the feedback signal may comprise modifying the sensing signal based on an emulation of an interaction of the sensing signal with the surrounding environment. This interaction may be emulated by using a predetermined surrounding model, which includes instructions to modify the sensing signal. For instance, by at least one of attenuating or amplifying the sensing signal, time delaying the sensing signal, frequency shifting the sensing signal, and phase shifting the sensing signal, and in this way to generate the sensing response signal. This may be done, respectively, by at least one signal processor of the processing circuitry.

Generating the feedback signal may include combining the sensing response signal and the communication response signal, optionally interleaving them in time. For example, the structure of the received JCAS signal—for instance comprising different time slots for sensing signal and communication signal—may be imitated and recreated. That is the feedback signal may be a JCAS response signal. This may be done by at least one of a signal combiner, signal shaper, and signal processor of the processing circuitry.

The system may further comprise a transmitted, for instance, a radio transmitter including a radio frontend and antenna, in order to send the feedback signal to the DUT. The feedback signal may be sent over a wireless or wired communication channel between the system and the DUT. However, the system may also send the feedback signal indirectly to the DUT, for instance, by sending it to another device that has established the communication channel with the DUT.

The system of the first aspect is suitable for testing any DUT that employs or contributes to JCAS. The system of the first aspect can measure and test a communication system or communication device that employ JCAS. Thus, it can contribute to the integration of communication and sensing.

In an implementation, the system is configured to perform the signaling test and the sensing test in a time-synchronized manner.

The time synchronization enables an efficient testing of the JCAS signal.

In an implementation, the system comprises a test instrument configured to perform both the signaling test and the sensing test, and to generate the feedback signal.

The signaling and sensing test can thus be performed in a single device. The test instrument may comprise the above-described processing circuitry. The test instrument may work in the digital domain or in the analog domain or in both the digital and analog domain, in order to process the sensing signal and communication signal, respectively, and perform the sensing and signaling tests.

The system may further comprise a transmitter to send the generated feedback signal to the DUT, or the test instrument comprises the transmitter. This implementation enables a one-box-solution.

In an implementation, the system comprises a first test instrument configured to perform the signaling test, and a second test instrument different from the first test instrument, the second test instrument being configured to perform the sensing test, and wherein the system is configured to generate the feedback signal by superposing the communication response signal from the first test instrument and the sensing response signal from the second test instrument.

The signaling and sensing test can thus be performed in multiple distributed devices. The test instruments may each comprise the above-described processing circuitry to perform their respective functions. The test instruments may work in the digital domain or in the analog domain or in both the digital and analog domain, in order to process the sensing signal and communication signal, respectively, and perform the sensing and signaling tests, respectively.

At least one of the first test instrument and the second test instrument may generate the feedback signal. The system may also comprise a signal combiner to generate the feedback signal. The system may further comprise a transmitter to send the generated feedback signal to the DUT, or at least one of the test instruments comprises the transmitter. This implementation is flexible and scalable.

In an implementation of the system, the communication response signal and the sensing response signal are superposed in the digital domain to generate the feedback signal.

This may be done by a digital signal processor or combiner. The communication signal and the sensing signal may be interleaved in time, or also in frequency. That is different time resources (like time slots) or different frequency resources (like subbands or subcarriers) or both may be used for the communication signal and the sensing signal.

In an implementation, the system further comprises one or more digital signal interfaces between the first test instrument and the second test instrument, and wherein at least one of the first test instrument and the second test instrument is configured to superpose the communication response signal and the sensing response signal to generate the feedback signal.

The digital signal interfaces may allow each or any of the test instruments to obtain both the sensing response signal and the communication response signal.

In an implementation, the system further comprises a digital signal combiner having a digital signal interface to respectively the first test instrument and the second test instrument, and being configured to generate the feedback signal by superposing the communication response signal and the sensing response signal.

The digital signal combiner can obtain the sensing response signal and the communication response signal over the respective digital interface. The digital interface may be a conventional, for instance, standardized digital interface. For instance it may be a serial digital interface (SDI), like a high-SDI (HD-SDI), or may be a high-definition multimedia interface (HDMI). Any suitable digital interface can be used, however.

In an implementation of the system, the communication response signal and the sensing response signal are superposed in the analog domain to generate the feedback signal.

This may be done by an analog signal processor or combiner. The communication signal and the sensing signal may be interleaved in time, or also in frequency. That is different time resources (like time slots) or different frequency resources (like subbands or subcarriers) or both may be used for the communication signal and the sensing signal.

In an implementation of the system, the communication response signal and the sensing response signal are superposed over the air to generate the feedback signal and send the feedback signal to the DUT.

For example, a transmitter of the system, possibly of one the test instruments, may send both the signaling response signal and the communication response signal, and may thereby combine them. For instance, the transmitter may interleave them in a time. The transmitter may combine the response signals before providing the combined feedback signal to an antenna.

In an implementation, the system further comprises an analog signal combiner having an analog signal interface to respectively the first test instrument and the second test instrument, and being configured to generate the feedback signal by superposing the communication response signal and the sensing response signal.

The analog signal combiner can obtain the sensing response signal and the communication response signal over the respective analog interface. The analog interface may be a conventional, for instance, standardized analog interface. For instance it may be a serial peripheral interface (SPI). Any suitable analog interface can be used, however.

In an implementation, the system further comprises an oscillator arranged in at least one of the first test instrument, the second test instrument, and a device separate from of the first test instrument and the second test instrument, and wherein the first test instrument and the second test instrument is, respectively, configured to perform the signaling test and the sensing test using the oscillator.

For instance, the oscillator may be used to excite both the first test instrument and the second test instrument. The oscillators may be of analog or digital design. The oscillator may work, for each test instrument, as a clock for a digital design or as a local oscillator (LO) to reach a target frequency (usable by the test instrument, for instance, a baseband frequency) through up- or downconversion of the frequency of the JCAS signal, or the communication signal and sensing signal, respectively. The oscillator may have various topologies, for example, a crystal synthesizer based phase locked loop (PLL) design or direct digital synthesis (DSS) design.

In an implementation, the system further comprises a controller configured to control, at least partly, both the first test instrument and the second test instrument.

Controlling partly may mean that only some functions of the test instrument may be controlled, or that the test instrument has an own controller, and the controllers cooperate. A controller may, for example, be a microprocessor, a computer, an integrated circuit (IC), or the like, and may contain one or more processors, for example, central processing units (CPUs). The controller may also have memory.

In an implementation of the system, the first test instrument and the second test instrument are configured to perform the signaling test and the sensing test in a time-synchronized manner.

For instance, they may be controlled by a common clock, which may be synchronized using an analog or digital synchronizer.

In an implementation of the system, the sensing test and the signaling test are performed over the air, or the JCAS signal is a wireless transmission signal.

The system may include a receiver, for instance, a radio receiver, configured to receive the JCAS signal over the air.

In an implementation of the system, the DUT is a base station, or a user equipment (UE), or a mobile device.

A mobile device may be a phone, smartphone, tablet, camera, car with phone, or the like. A UE may be a mobile phone, a vehicle, a TV, a tablet, or the like. A base station may be a gNodeB, or a random access network (RAN) node, or a transmit and receive point (TRP), or a WiFi access point or the like.

In an implementation of the system, the signaling test emulates a decoding and re-encoding of multiple layers of the communication signal.

For example, to perform the signaling test, the system, possibly the first test instrument, may decode all layers of the communication signal, and may re-encode all layers of the decoded communication signal to produce the communication response signal. For example, the multiple layers may be layers according to a protocol stack of the underlying transport protocol used by the DUT. For example, the multiple layers may be layers of the open systems interconnection (OSI) model. The multiple layers may include one or more of a physical layer (PHY), a medium access control (MAC) layer, a radio link control (RLC) layer, a packet data convergence protocol (PDCP) layer, a radio resource control (RRC) layer, and a non-access stratum (NAS) layer.

In an implementation of the system, the sensing test emulates reflections of the sensing signal based on a surrounding model.

In an implementation of the system, the sensing response signal is generated by modifying the sensing signal based on a surrounding model.

The surrounding model may comprise a model of obstacles, like houses or trees, or moving objects, like vehicles or pedestrians, and other communication or sensing device in a predetermined environment. A real sensing signal would reflect from these obstacles, objects, or devices, and would be received by a sensing receiver. This sensing receiver could derive information from the reflected sensing signal. The system, possibly the second test instrument, may modify the sensing signal to emulate such reflections. The produced sensing response signal may resemble a reflected sensing signal in the predetermined environment according to the surrounding model. The surrounding model may comprise parameters or signal processing instructions that allow the system to modify the sensing signal. The DUT may view the sensing response signal as a reflection of the sensing signal.

In an implementation, the system is further configured to obtain sensing information from the DUT, the sensing information having been generated by the DUT based on the sensing response signal in the feedback signal, and verify the sensing information based on one or more predetermined requirements.

The sensing information may be information which the DUT derived from viewing the sensing response signal as reflected sensing signal. That is, the sensing information may comprise information regarding obstacles, objects, or devices that are used for the surrounding model. The system may verify whether the sensing information determined by the DUT matches to what the surrounding model suggests. Thereby, the predetermined requirements, which may contain some accuracy requirements, or the like are taken into account.

A second aspect of this disclosure provides a method for testing a JCAS signal, received from a DUT, wherein the JCAS signal comprises a communication signal and a sensing signal, the method comprising performing a signaling test on the communication signal, thereby producing a communication response signal, performing a sensing test on the sensing signal, thereby producing a sensing response signal, and generating a feedback signal by combining the communication response signal and the sensing response signal, and sending the feedback signal to the DUT.

The method of the second aspect may be performed by the system of the first aspect. The method of the second aspect may have implementations, which correspond to the implementations of the system of the first aspect. That is, each system implementation of the first aspect may have a corresponding method implementation of the second aspect. The method of the second aspect may achieve the same advantages as the system of the first aspect.

A third aspect of this disclosure provides a computer program comprising instructions which, when the program is executed by a computer, cause the computer to perform the method according to the second aspect or any implementation thereof, or to control the system of the first aspect or any of its implementations.

For instance, the computer program may be performed by the processing circuitry (may form a computer) of the system of the first aspect. The computer program may be executed by a controller of the system, for instance, to control the first test instrument and the second test instrument, or the single test instrument.

A fourth aspect of this disclosure provides a storage medium storing executable program code which, when executed by a processor, causes the method according to the second aspect or implementation thereof to be performed, or to control the system of the first aspect or any of its implementations, particularly, to perform the described steps.

All devices and other means described in this disclosure may be implemented in software or hardware elements or any kind of combination thereof. Steps and functions performed by these devices are intended to describe that the respective device is adapted to or configured to perform the steps and functions. Even if a specific step or function to be performed by an entity is not reflected in the description of a specific detailed element of that entity, which performs that specific step or function, it should be clear for a skilled person that these steps and functions can be implemented in respective software or hardware elements, or any kind of combination thereof.

BRIEF DESCRIPTION OF THE DRAWINGS

The above described aspects and implementations are explained in the following detailed description with respect to the enclosed drawings.

DETAILED DESCRIPTION

Figure 1:
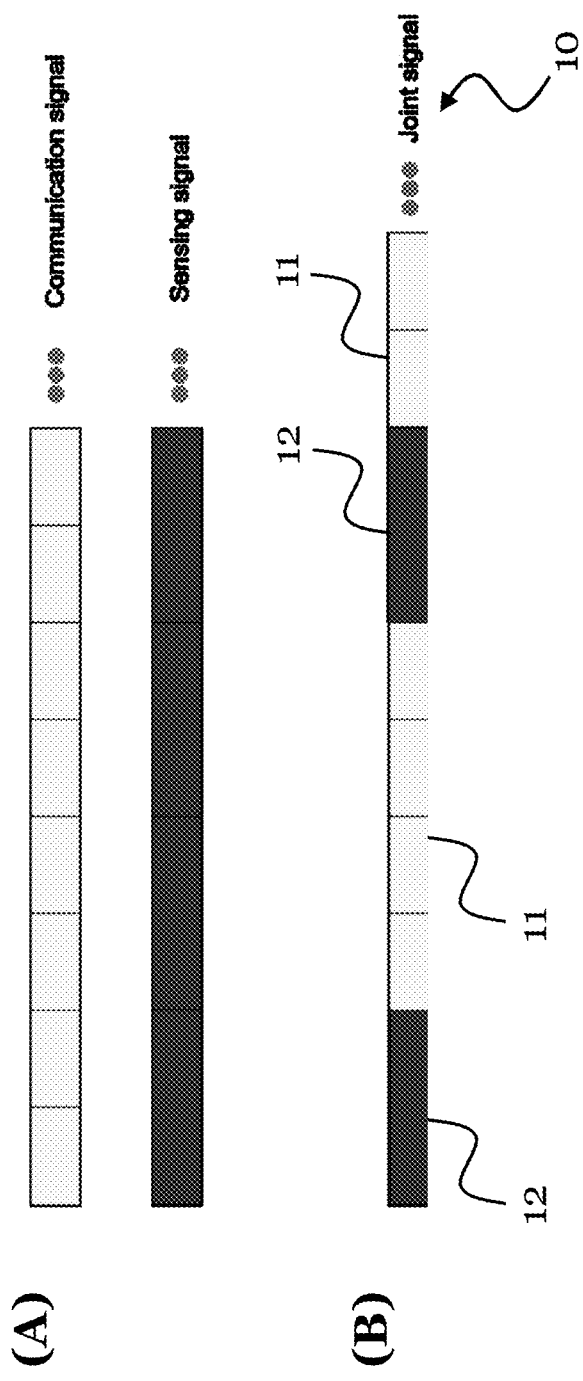
FIG. 1 shows in (A) a separate communication signal and sensing signal as used conventionally, and in (B) an example of a JCAS signal.

FIG. 2(A) shows how an exemplary signaling test, without sensing, may be performed. In particular, the example of FIG. 2(A) illustrates a test of a communication protocol as the exemplary signaling test. A DUT, for instance a network device like a base station, sends a communication signal to a test and measurement system, which is in this example based on connected mobile experience (CMX). The test and measurement system decodes and re-encodes all the layers (according to an underlying communication protocol) of the communication signal in the signaling test. That is, the received communication signal is completely decoded by the system, and is then re-encoded again through all the same layers (according to the underlying communication protocol) by the system, and is the sent back by the system to the DUT as a communication response signal. The signaling test may in this way emulate the decoding and re-encoding of the multiple layers of the communication signal, for example, as it would be performed by a UE in a real communication scenario. The system may thus emulate the UE.

FIG. 2(B) shows how an exemplary sensing test, without communication, may be performed. In particular, the example of FIG. 2(B) illustrates a radar-environment test as the exemplary sensing test. A DUT, for instance a radar device, sends a sensing signal to the test and measurement (T&M) system. In this example, the processing chain of the T&M system may involve much less as in CMX of the example of FIG. 2(A). For example, the received sensing signal may be simply reflected back to the DUT by the T&M system as a sensing response signal, wherein only a few signal manipulations—according to a surrounding model maintained at the T&M system—may be performed on the sensing signal, to generate the sensing response signal. The sensing test may emulate reflections of the sensing signal in a fictional or modelled environment defined by the surrounding model. For instance, a gain of the sensing signal may be manipulated, or a Doppler effect (frequency shift) or a delay (time shift) may be taken into account and applied to the sensing signal, when generating the sensing response signal.

FIG. 2(C) shows a system 20 according to this disclosure, wherein the system 20 is configured to test a JCAS signal 10 received from a DUT 21, wherein the JCAS signal 10 includes a communication signal 11 and a sensing signal 12. The system 20 may be a combination of the examples of FIG. 2(A) and FIG. 2(B), and can accordingly perform both the signaling test and the sensing test. For instance, it may perform the signaling test describe with respect to FIG. 2(A) and the sensing test described with respect to FIG. 2(B). After performing these signaling and sensing tests on the JCAS signal 10, the system 20 is adapted to send back a feedback signal 22 to the DUT 21, wherein the feedback signal 22 comprises a communication response signal and a sensing response signal. The communication response signal and a sensing response signal may be generated as described respectively with respect to FIG. 2(A) and FIG. 2(B).

Figure 2:
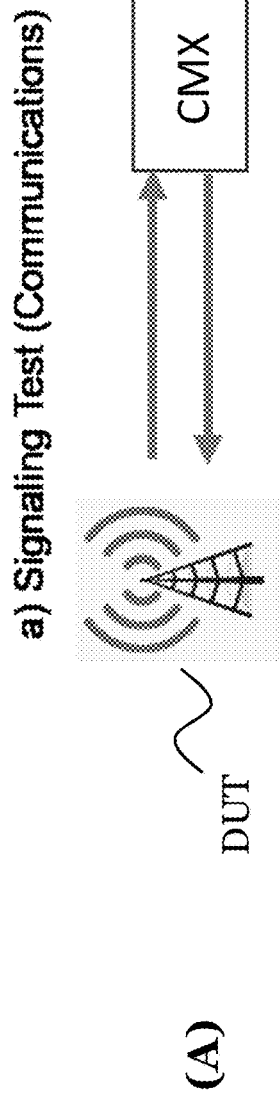
FIG. 2 shows in (A) an example of a signaling test, in (B) an example of a sensing test, and in (C) a JCAS test according to this disclosure.
Figure 2:
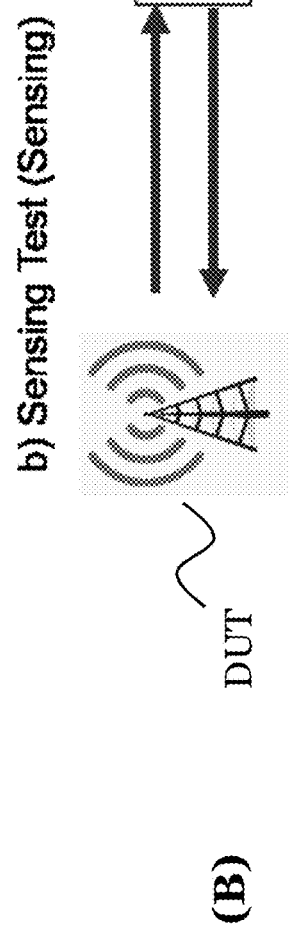
Figure 2:
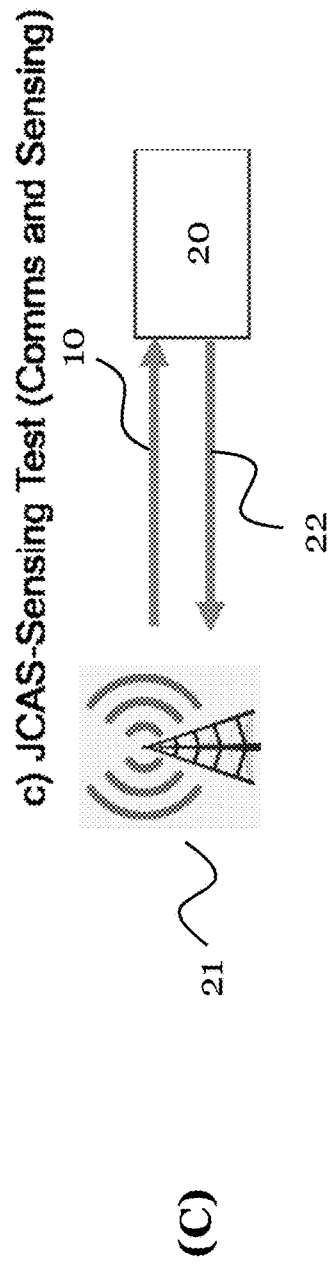
Figure 3:
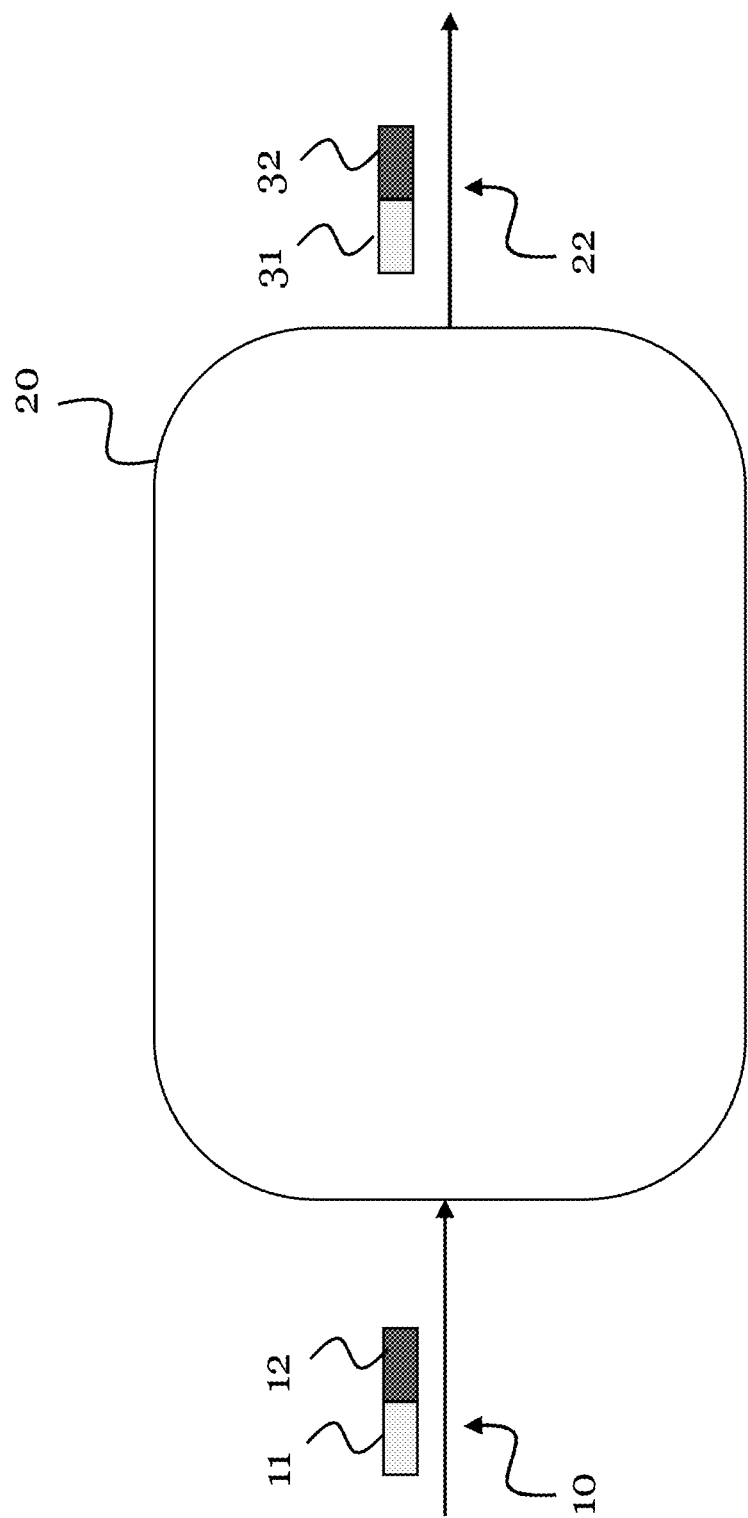
FIG. 3 shows a system for testing a JCAS signal according to this disclosure.

Further details of a system 20 according to this disclosure, which may implement the system 20 of FIG. 2. are shown in FIG. 3. The system 20 is configured to receive the JCAS signal 10, for instance, directly or indirectly from the DUT 21. The JCAS signal 10 may be like, or similar to, the one shown in FIG. 1(B). The JACAS signal 10 may comprise the communication signal 11 and the sensing signal 12 in a superimposed, optionally interleaved manner. For instance, interleaved in time. The system 20 is then configured to perform the signaling test on the communication signal 11 included in the JCAS signal 10, and to perform the signaling test on the sensing signal 12 included in the JCAS signal 10.

Thereby, a communication response signal 31 and a sensing response signal 32 are respectively produced. This may work as described with respect to FIG. 2. The feedback signal 22 may be sent by the system 20 directly or indirectly to the DUT 21, and includes the communication response signal 31 and the sensing response signal 32.

For example, the signaling test performed by the system 20 may emulate a decoding and re-encoding of multiple layers of an underlying communication protocol used for the communication signal 11. The system 20 may thereby emulate a UE, as in the example of FIG. 2(A). The system 20 may generate the communication response signal 31 by re-encoding the decoded communication signal 11.

For example, the sensing test performed by the system 20 may emulate reflections of the sensing signal 12 in a modelled environment, based on a surrounding model, as in the example of FIG. 2(B). The system 20 may generate the sensing response signal 32 by modifying the sensing signal 12 based on the surrounding model. For instance, a gain of the sensing signal 12 may be modified based on the surrounding model to generate the sensing response signal 32. Based on the surrounding model, also a signal delay may be emulated and applied to the sensing signal 12 to generate the sensing response signal 32. Further, a Doppler effect, emulating a movement, may be taken into account to accordingly adjust the sensing signal 12 to generate the sensing response signal 32. Combinations are possible.

Figure 4:
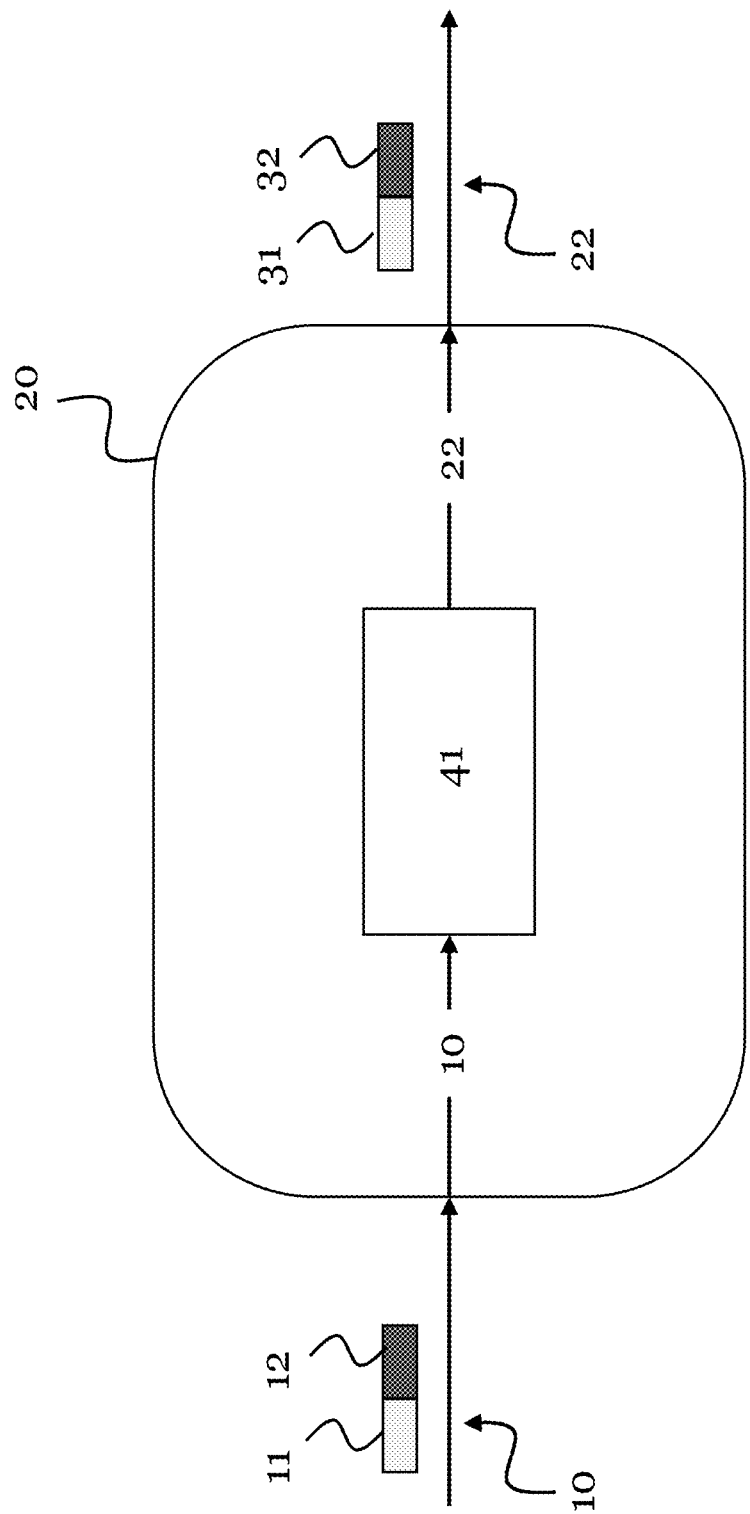
FIG. 4 shows an exemplary system for testing a JCAS signal according to this disclosure, the system including a test instrument.

FIG. 4 shows an exemplary system 20 for testing a JCAS signal 10 according to this disclosure, which may build on the system 20 shown in FIG. 3. Same elements are labelled with the same reference signs. In the example of FIG. 4, the system 20 comprises a test instrument 41, which may be the single test instrument of the system 20. The test instrument 41 is configured to perform both the signaling test and the sensing test as described above. Further, the test instrument 41 is configured to generate the communication response signal 31, the sensing response signal 32, and the feedback signal 22 intended for the DUT 21, as described above.

As can be seen, the JCAS signal 10, which comprises the communication signal 11 and the sensing signal 12, is input into the test instrument 41, and the feedback signal 22, which comprises the communication response signal 31 and the sensing response signal 32, is output by the test instrument 41. In other words, the sensing test and the signaling test are combined in one common instrument (device). Notably, the sensing signal 12 and the communication signal 11 may be superposed, and optionally time-interleaved, by the system 20 into the JCAS signal 10, for instance as shown in FIG. 1(B). However, this is only an example and not limiting for the present disclosure. Likewise, the sensing response signal, 32 and the communication response signal 31 may be superposed, and optionally time-interleaved, in the feedback signal 22.

Figure 5:
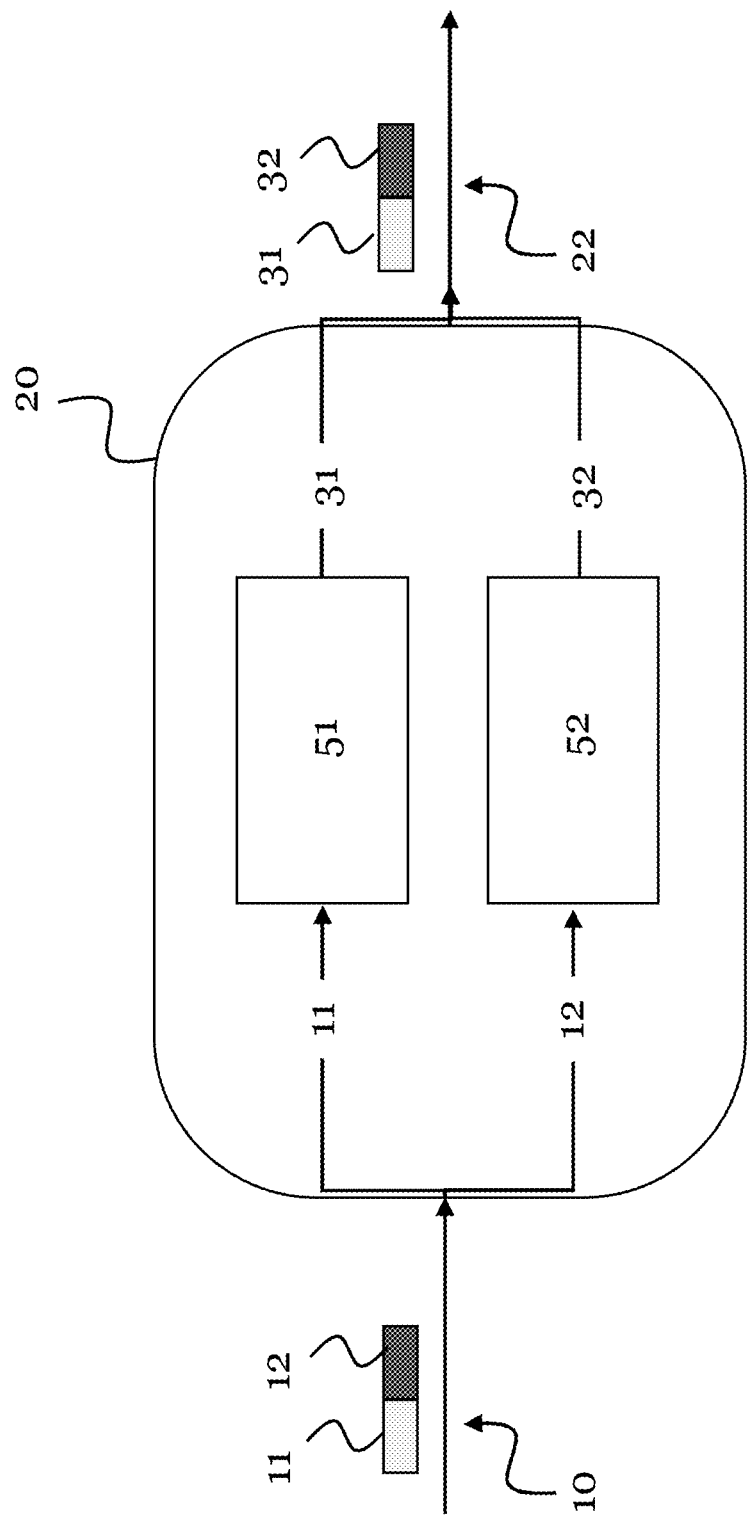
FIG. 5 shows an exemplary system for testing a JCAS signal according to this disclosure, the system including a first test instrument and a second test instrument.

FIG. 5 shows another exemplary system 20 for testing a JCAS signal 10 according to this disclosure, which may build on the system shown in FIG. 3. Same elements are labelled with the same reference signs. In this example of FIG. 5, the system 20 comprises a first test instrument 51 and a second test instrument 52. The first test instrument 51 is different from the second test instrument 52, i.e., is a different device. The first test instrument 51 is configured to perform the signaling test, and the second test instrument 52 is configured to perform the sensing test, as described above. Accordingly, the first test instrument 51 outputs the communication response signal 31, and the second test instrument 52 outputs the sensing response signal 32, as described above. The system 20 is then configured to generate the feedback signal 22 by superposing, and optionally time-interleaving, the communication response signal 31 and the sensing response signal 32.

As can be seen in FIG. 5, the JCAS signal 10, which comprises the communication signal 11 and the sensing signal 12, may be input to the system 20 and may be separated into the communication signal 11, which is provided as input into the first test instrument 51, and the sensing signal 12, which is provided as input into the second test instrument 52. For instance, a part of a time-slot structure of the JCAS signal 10 (see FIG. 1(B), for example) may be passed to the signaling test, while another part of the time-slot structure of the JCAS signal 10 may be passed to the sensing test. Between the two tests, a feedback may occur, in order to adjust one or more test parameters. That is, the first test instrument 51 and the second test instrument 52 may be configured to exchange feedback messages, for example, via a digital interface or an analog interface between them, and may respectively adjust the one or more test parameters based on the received feedback message.

As an example, the system 20 may comprise a signal splitter configured to split the JCAS signal 10 into the sensing signal 12 and the communication signal 11. However, it is also possible that the JCAS signal 10 is not split, and is provided to both the first test instrument 51 and the second test instrument 52 as an input. The respective test instrument 51, 52 can then perform the signaling test or the sensing test, respectively, on the relevant parts of the JCAS signal 10, wherein these parts hold the communication signal 11 and respectively the sensing signal 12.

Figure 6:
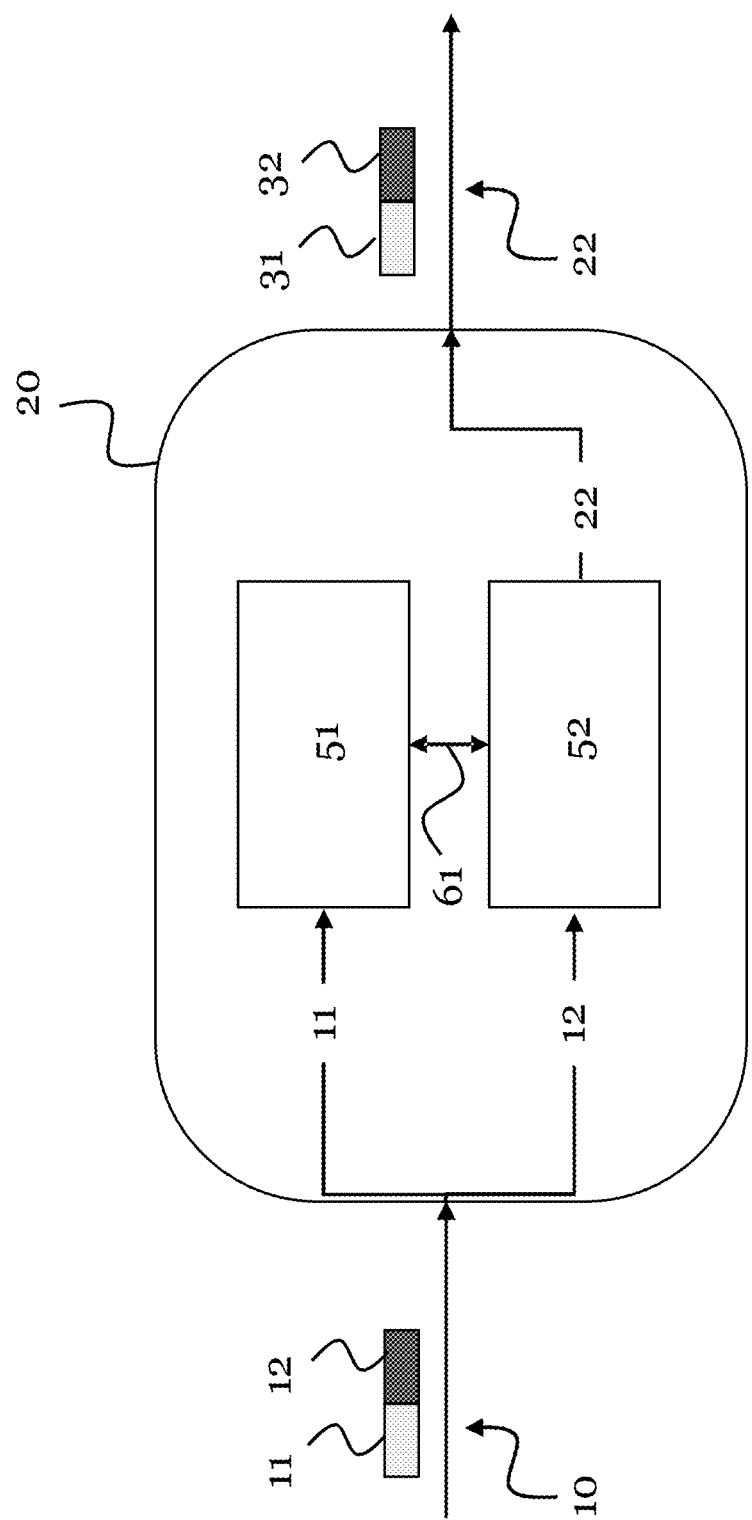
FIG. 6 shows an exemplary system for testing a JCAS signal according to this disclosure, the system including a digital interface between the first test instrument and the second test instrument.

FIG. 6 shows another exemplary system 20 for testing a JCAS signal 10 according to this disclosure, which may build on the system 20 of FIG. 5. In this example, like in FIG. 5, the system 20 comprises the first test instrument 51 and the second test instrument 52. Further, the system 20 may comprise a digital interface 61 between the first test instrument 51 and the second test instrument 52. The digital interface 62 may be used by the first test instrument 51 and the second test instrument 52 to exchange information, e.g., the feedback messages. As another example, the first test instrument 51 may provide the signaling response signal 31 to the second test instrument 52 via the digital interface 61. Similarly, the second test instrument 52 may provide the communication response signal 32 to the first test instrument 51 via the digital interface 61. Then, at least one of the first test instrument 51 and the second test instrument 52 may be configured to superimpose, and optionally time—interleave, the communication response signal 31 and the sensing response signal 32 to generate the feedback signal 22 intended for the DUT 21. Just as an example, FIG. 6 illustrates that the second test instrument 51 outputs the feedback signal 22. It is also possible that the first test instrument 51 outputs the feedback signal 22. Like in FIG. 5, each test instrument 51, 52 may obtain the relevant communication signal 11 and sensing signal 12, or may extract the relevant parts from the received JCAS signal 10.

Figure 7:
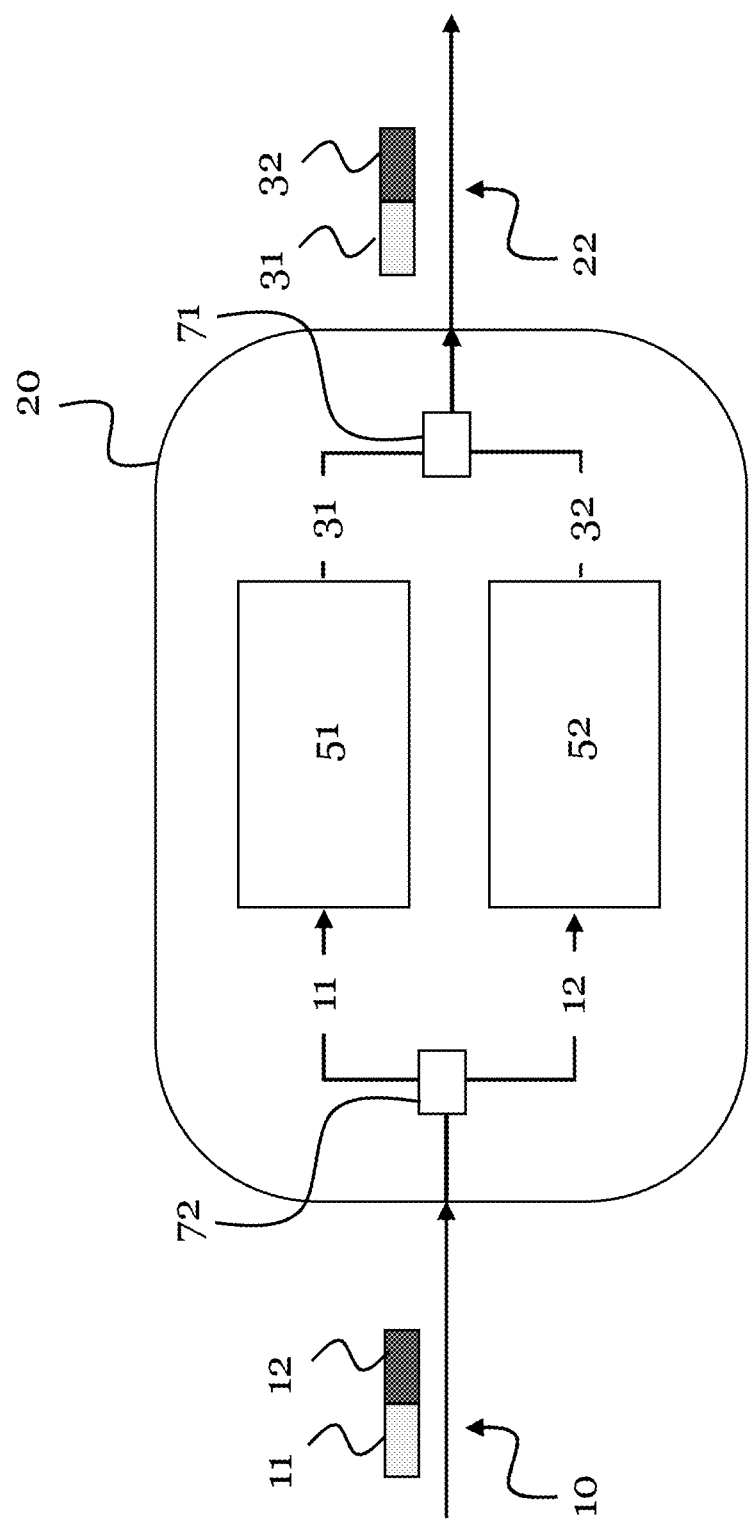
FIG. 7 shows an exemplary system for testing a JCAS signal according to this disclosure, the system including a signal combiner

FIG. 7 shows another exemplary system 20 for testing a JCAS signal 10 according to this disclosure, which may build on the system 20 of FIG. 5. Like in FIG. 5 and FIG. 6, the system 20 in FIG. 7 comprises the first test instrument 51 and the second test instrument 52. The system 20 also comprises a signal combiner 71. The signal combiner 71 may be an analog signal combiner, which has an analog signal interface to each of the first test instrument 52 and the second test instrument 52. The analog signal combiner may then be configured to generate the response signal 22 by superposing, and optionally time-interleaving, the communication response signal 31 and the sensing response signal 32 in the analog domain. The signal combiner 71 may also be a digital signal combiner, which has a digital signal interface to each of the first test instrument 51 and the second test instrument 52. The digital signal combiner is then configured to generate the feedback signal 22 by superposing, and optionally time-interleaving, the communication response signal 31 and the sensing response signal 32 in the digital domain.

FIG. 7 also shows an optional signal splitter 72 of the system 20, which is configured to split the JCAS signal 10 into the communication signal 11 and the sensing signal 12. After splitting the JCAS signal 10, the communication signal 11 may be input into the first test instrument 51, and the sensing signal 12 may be input into the second test instrument 52 as described above.

Notably, in each system 20 of this disclosure, which comprises the first test instrument 51 and the second test instrument 52, the two test instruments 51, 52 may be time synchronized. For instance, they can be configured to perform the signaling test and the sensing test in a time-synchronized manner, for instance, according to a same clock. They may also output the communication response signal 31 and the sensing response signal 32 at the same time, in order to allow the system 20 to efficiently superimpose, and optionally time-interleave, these outputs to generate the feedback signal 22, possibly in real time.

Optionally, as an alternative to the analog signal combiner described above, the system 20 may be configured to superimpose, and optionally time-interleave, the communication response signal 31 and the sensing response signal 32, when it sends the feedback signal 22 to the DUT 21. For instance, a transmitter of the system 20 may combine the communication response signal 31 and the sensing response signal 32 for transmitting the feedback signal 22 in a wireless or wired manner to the DUT 21. In a similar manner, also the JCAS signal 10 may be a wireless signal, which may be received over the air by the system 20, for example, by a receiver of the system 20. The system 20 may generally have a wired or wireless downlink channel from the DUT 21 to the system 20, and may generally have a wired or wireless uplink channel from the system 20 to the DUT 21.

In all the above-shown examples, the DUT 21 may be a base station, or a UE, or a mobile device, and the system 20 may comprise one device or multiple devices (e.g., one or multiple test instruments) for performing the respective signaling test and sensing test.

Figure 8:
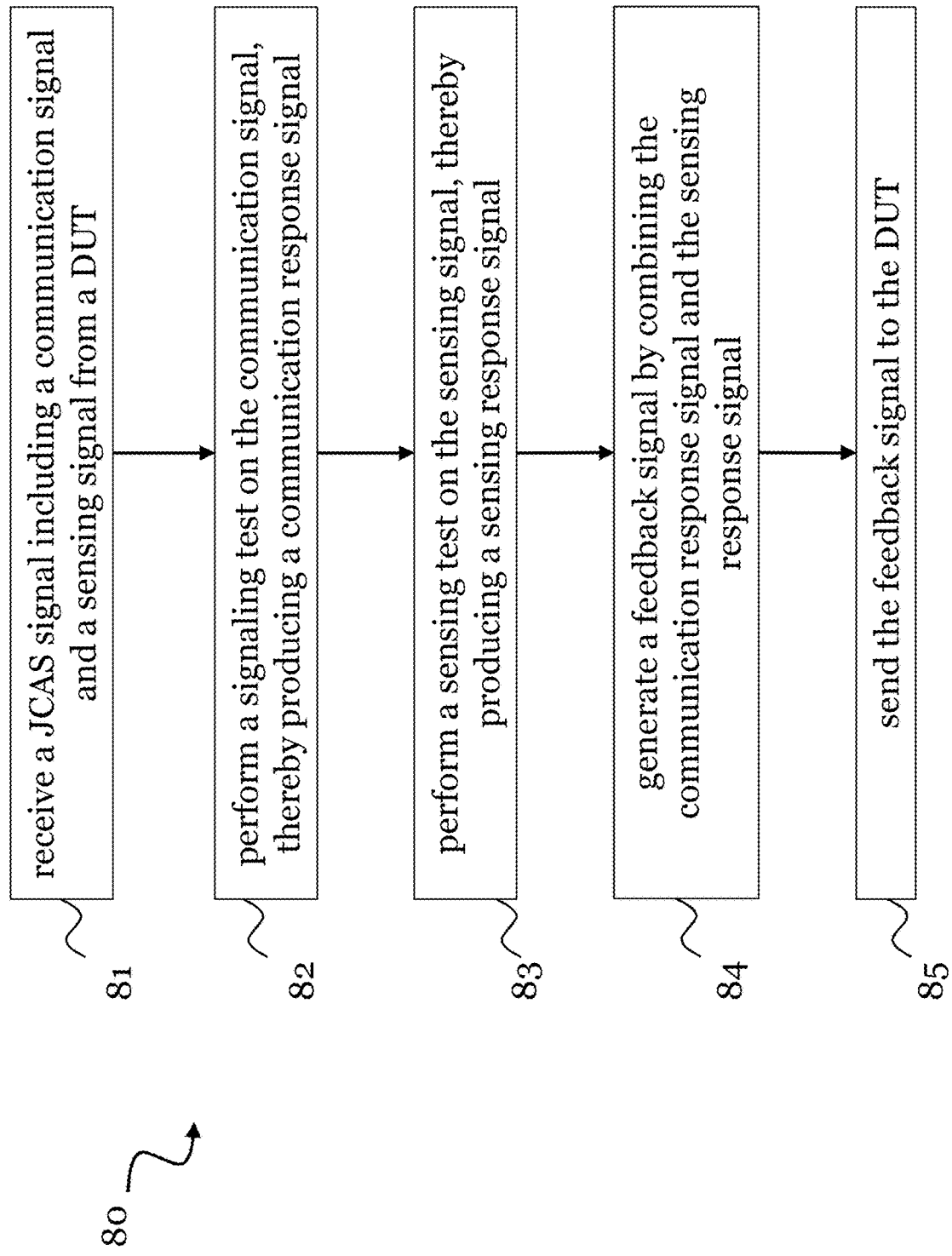
FIG. 8 shows a method for testing a JCAS signal according to this disclosure.

FIG. 8 shows a method 80 for testing a JCAS signal according to this disclosure. The method 80 is suitable for testing a JCAS signal 10, which is received 81 from a DUT 21. The JCAS signal 10 comprises a communication signal 11 and a sensing signal 12. The method 80 may be performed by the system 20 of this disclosure.

The method 80 further comprises a step 82 of performing a signaling test on the communication signal 11, thereby producing a communication response signal 31. The method 80 also comprises a step 83 of performing a sensing test on the sensing signal 12, thereby producing a sensing response signal 32. The steps 81 and 82 may be performed at the same time, for example, in a time-synchronized manner. Further, the method 80 comprises a step 84 of generating a feedback signal 22 by combining the communication response signal 31 and the sensing response signal 32, for instance, superposing or interleaving these signals, and comprises a step 85 of sending the feedback signal 22 to the DUT 21.

Thus disclosure has been described in conjunction with various aspects, implementations, and examples. However, other variations can be understood and effected by those persons skilled in the art and practicing the claimed subject matter, from the studies of the figures, and the description. In the entire disclosure, the word "comprising" does not exclude other elements or steps. In the entire disclosure, the indefinite article "a" or "an" does not exclude a plurality.

The invention claimed is:

1. A system for testing a joint communication and sensing, JCAS, signal, received from a device under test, DUT, the JCAS signal comprising a communication signal and a sensing signal, the system comprising:
a first test instrument configured to perform a signaling test on the communication signal, the signaling test producing a communication response signal, and
a second test instrument different from the first test instrument, the second test instrument being configured to perform a sensing test on the sensing signal, the sensing test producing a sensing response signal, and
the system being configured to send a feedback signal to the DUT,
wherein one of:
the system further comprises one or more digital signal interfaces between the first test instrument and the second test instrument, wherein at least one of the first test instrument and the second test instrument is configured to superpose the communication response signal and the sensing response signal in the digital domain to generate the feedback signal;
the system further comprises a digital signal combiner having a digital signal interface to respectively the first test instrument and the second test instrument, and being configured to generate the feedback signal by superposing the communication response signal and the sensing response signal in the digital domain; and
the system further comprises an analog signal combiner having an analog signal interface to respectively the first test instrument and the second test instrument, and being configured to generate the feedback signal by superposing the communication response signal and the sensing response signal in the analog domain.

2. The system according to claim 1, configured to perform the signaling test and the sensing test in a time-synchronized manner.

3. The system according to claim 1, comprising
a test instrument configured to perform both the signaling test and the sensing test, and to generate the feedback signal.

4. The system according to claim 1, wherein the communication response signal and the sensing response signal are superposed over the air to generate the feedback signal and send the feedback signal to the DUT.

5. The system according to claim 1, further comprising
an oscillator arranged in at least one of the first test instrument, the second test instrument, and a device separate from of the first test instrument and the second test instrument, and
wherein the first test instrument and the second test instrument is, respectively, configured to perform the signaling test and the sensing test using the oscillator.

6. The system according to claim 1, further comprising
a controller configured to control, at least partly, both the first test instrument and the second test instrument.

7. The system according to claim 1, wherein
the first test instrument and the second test instrument are configured to perform the signaling test and the sensing test in a time-synchronized manner.

8. The system according to claim 1, wherein
the sensing test and the signaling test are performed over the air, or
the JCAS signal is a wireless transmission signal.

9. The system according to claim 1, wherein the DUT is a base station, or a user equipment, or a mobile device.

10. The system according to claim 1, wherein the signaling test emulates a decoding and re-encoding of multiple layers of the communication signal.

11. The system according to claim 1, wherein the sensing test emulates reflections of the sensing signal based on a surrounding model.

12. The system according to claim 1, wherein the sensing response signal is generated by modifying the sensing signal based on a surrounding model.

13. The system according to claim 1, further configured to
obtain sensing information from the DUT, the sensing information having been generated by the DUT based on the sensing response signal in the feedback signal, and
verify the sensing information based on one or more predetermined requirements.

14. A method for testing a joint communication and sensing, JCAS, signal, received from a device under test, DUT, wherein the JCAS signal comprises a communication signal and a sensing signal, the method comprising:
performing a signaling test on the communication signal with a first instrument, thereby producing a communication response signal,
performing a sensing test on the sensing signal with a second test instrument
different from the first test instrument, thereby producing a sensing response signal, and
sending feedback signal to the DUT
wherein the method further comprises one of:
superposing the communication response signal and the sensing response signal in the digital domain to generate the feedback signal with at least one of the first test instrument and the second test instrument, wherein the system comprises one or more digital signal interfaces between the first test instrument and the second test instrument;
generating the feedback signal by superposing the communication response signal and the sensing response signal in the digital domain with a digital signal combiner having a digital signal interface to respectively the first test instrument and the second test instrument; and generating the feedback signal by superposing the communication response signal and the sensing response signal in the analog domain with an analog signal combiner having an analog signal interface to respectively the first test instrument and the second test instrument.

* * * * *